United States Patent
Sundelin

(10) Patent No.: US 11,150,262 B1
(45) Date of Patent: Oct. 19, 2021

(54) SYSTEM AND METHOD FOR ANGLE OF ATTACK SENSOR

(71) Applicant: Christopher Williams, Charlottesville, VA (US)

(72) Inventor: Ronald Sundelin, Yorktown, VA (US)

(73) Assignee: Christohper Williams, Charlottesville, VA (US)

( * ) Notice: Subject to any disclaimer, the term of this patent is extended or adjusted under 35 U.S.C. 154(b) by 0 days.

(21) Appl. No.: 17/142,554

(22) Filed: Jan. 6, 2021

Related U.S. Application Data

(60) Provisional application No. 63/015,142, filed on Apr. 24, 2020.

(51) Int. Cl.
*G01P 5/12* (2006.01)
*B64D 43/02* (2006.01)
*G01P 13/02* (2006.01)
*G01K 13/02* (2021.01)

(52) U.S. Cl.
CPC ............... *G01P 5/12* (2013.01); *B64D 43/02* (2013.01); *G01K 13/02* (2013.01); *G01P 13/025* (2013.01)

(58) Field of Classification Search
CPC .......... G01D 5/12; G01K 13/02; G01K 1/143; G01K 13/024; G01K 13/028; B64D 43/02; B64D 15/20; G01P 5/10; G01P 13/025; G01F 1/68–699
See application file for complete search history.

(56) References Cited

U.S. PATENT DOCUMENTS

| | | | |
|---|---|---|---|
| 4,819,480 A * | 4/1989 | Sabin | B64D 15/20 244/134 F |
| 5,237,867 A | 8/1993 | Cook | |
| 5,790,026 A * | 8/1998 | Lardiere, Jr. | B64D 15/20 244/134 D |
| 7,031,871 B2 | 4/2006 | Severson et al. | |
| 7,870,784 B2 | 1/2011 | Santos | |
| 8,485,473 B2 * | 7/2013 | Picco | B64D 15/20 244/134 F |
| 9,702,892 B1 * | 7/2017 | Richardson | G06N 5/022 |
| 2003/0115948 A1 | 6/2003 | Rouse | |
| 2007/0235731 A1 | 10/2007 | Brody | |
| 2009/0242549 A1 | 10/2009 | Hogate | |
| 2009/0255336 A1 | 10/2009 | Horning | |

(Continued)

FOREIGN PATENT DOCUMENTS

| EP | 1236027 | 3/2006 |
|---|---|---|
| WO | 2015142552 | 3/2015 |

OTHER PUBLICATIONS

International Search Report and Written Opinion from application serial No. PCT/US21/12600 dated Apr. 26, 2021.

*Primary Examiner* — Justin N Olamit
(74) *Attorney, Agent, or Firm* — Hogan Lovells US LLP

(57) ABSTRACT

A sensor assembly includes a metallic layer positioned at least partially on an insulating material coupled to a fuselage of an aircraft. The sensor assembly further includes a pair of terminals arranged at opposite ends of the metallic layer and a temperature probe thermally coupled to the metallic layer. The metallic layer is heated by a heater thermally coupled to the metallic layer. The temperature probe is used to determine a rate of cooling for the metallic layer, responsive to an air flow over the metallic layer.

20 Claims, 9 Drawing Sheets

(56) References Cited

U.S. PATENT DOCUMENTS

| | | |
|---|---|---|
| 2011/0215087 A1* | 9/2011 | Martinez ............ G05D 23/1917 |
| | | 219/494 |
| 2012/0266669 A1* | 10/2012 | Sage ...................... G01N 25/04 |
| | | 73/170.26 |
| 2013/0099008 A1 | 4/2013 | Aljabari |
| 2015/0344137 A1 | 12/2015 | Bartz et al. |
| 2016/0165707 A1 | 6/2016 | Clemen, Jr. et al. |
| 2016/0176530 A1 | 6/2016 | Skjoedt |
| 2018/0237155 A1 | 8/2018 | Ueda et al. |
| 2019/0152580 A1 | 5/2019 | Dege et al. |

\* cited by examiner

SYSTEM AND METHOD FOR ANGLE OF ATTACK SENSOR

CROSS REFERENCE TO RELATED APPLICATIONS

This application claims priority to and the benefit of co-pending U.S. Provisional Application Ser. No. 63/015,142 filed Apr. 24, 2020 titled "SYSTEM AND METHOD FOR ANGLE OF ATTACK SENSOR," the full disclosure of which is hereby incorporated herein by reference in its entirety for all purposes.

BACKGROUND

The rate of climb of an aircraft is governed by the attitude of the aircraft relative to its direction of travel through the atmosphere. The angle between the attitude and direction of travel is known as the angle-of-attack (AOA). The rate of climb of the aircraft increases with increasing AOA up to a limit, above which the airflow pattern is changed and the force lifting the aircraft abruptly decreases. As a result, AOA information is utilized to provide safe operation of the aircraft. A commonly used method for measuring the AOA comprises a protuberance, usually several inches long, extending outward from the fuselage of the aircraft. The air moving past the fuselage exerts a force on this protuberance. The direction of this force is sensed and used, together with other information about the specific aircraft configuration, to determine the AOA. These sensors can be damaged, for example by collisions with birds or during cleaning operations, thereby reducing information utilized for operation of the aircraft.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

Figure 1:
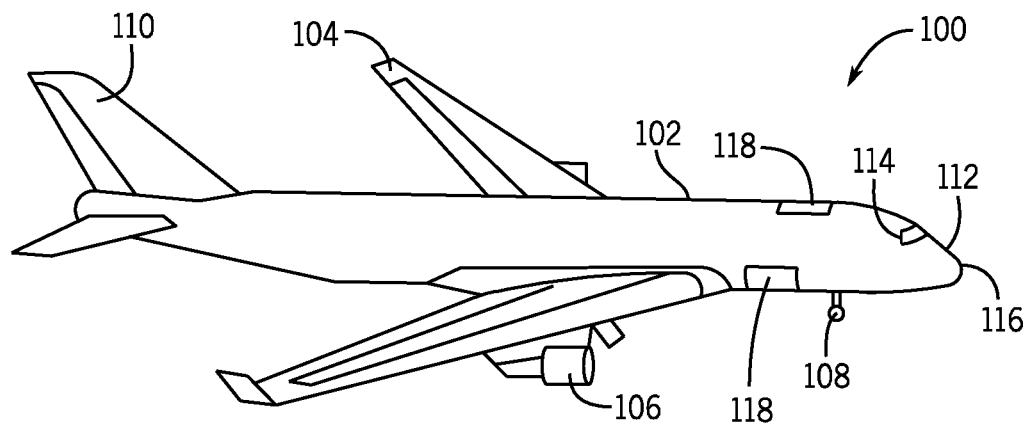
FIG. 1 is a schematic side view of an embodiment of an aircraft that may be equipped with sensors, in accordance with embodiments of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present disclosure are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations. Moreover, like reference numerals may be used for like items throughout the specification, however, such usage is for convenience and is not intended to limit the scope of the present disclosure.

Embodiments of the present disclosure may be directed toward an AOA sensor that utilizes a determination of a rate of cooling for a layer forming at least a portion of an aircraft. In various embodiments, the sensor assembly configuration and methods of used described herein may be utilized with a variety of aircrafts at commercial aircraft altitudes. Various embodiments may be utilized to measure an air speed including at least two temperature sensors. Furthermore, embodiments may also determine the presence of moisture, such as rain, over the sensor and also determine a thickness of a fluid film over the sensor layer. In various embodiments, a surface layer is cooled as air passes over the surface layer. The surface layer may be thermally insulated from an interior of the aircraft. In certain embodiments, a temperature of the surface layer is regulated, either continuously or using pulsed operator, to regulate the heating of the surface layer.

Embodiments may be directed toward configurations that illustrate high sensitivity at low air speeds. Furthermore, the sensor assembly may be substantially integrated into an aircraft such that the surface does not protrude from a surface of the aircraft. For example, components of the sensor assembly may be flush and/or recessed into the surface. As will be described herein, embodiments may include precision heating circuitry and precision thermometry readouts to regulate and measure temperature of the surface layer. The surface layer may be a metallic layer that resists mechanical damage and includes properties to minimize time constants. Moreover, in various embodiments, multiple sensor assemblies may be deployed and evaluated, for example using computer circuitry, to determine AOA.

Various configurations include a weaved or interleaved comb configuration for the surface layer including alternating connections to two terminals. Such configurations may enable water film measurement, which embodiments may determine and then adjust temperature readings. Furthermore, embodiments may include configurations to enable water-layer-caused capacitance measurements. Moreover, in embodiments, components of the system may also be utilized to de-ice the surface layer. Circuitry may enable high repetition rate readouts.

In various embodiments, reflective plating may be included to retard corrosion and reflective plating may also be used to reflect sunlight. Various configurations may omit moving or deformed parts. While embodiments described herein may include circuitry controlled heating, it should be appreciated that various embodiments may also be modified to determine directed heating of a cooled layer. As an example, a cooled layer may include a serpentine pattern. Additional features of the disclosed embodiments may include material selection to minimize thermal expansion and sufficient strength properties to reduce the likelihood of damage due to maintenance or bird strikes. Furthermore, various embodiments may also include a variety of additional sensors to measure various properties of the aircraft, ambient temperature, heater power, or the like.

FIG. 1 is a perspective view of an embodiment of an aircraft 100. The illustrated aircraft 100 includes a fuselage 102, wings 104, engines 106 mounted to the wings 104, wheels 108, and a tail 110. It should be appreciated that various rudder and flap systems may also be incorporated into the aircraft, for example into the tail 110 or wings 104, but that such systems have not been included for simplicity with the present discussion.

The illustrated aircraft 100 includes a conical nose 112 that is positioned forward of a window associated with a cockpit 114 at a front 116 of the aircraft 100. In various embodiments, traditional angle-of-attack (AOA) sensors may be arranged proximate the nose 112 and/or along the fuselage 102. As previously noted, at least because of their size and arrangement to extend away from the aircraft body, traditional AOA sensors may be subject to damage from a variety of factors, including but not limited to, bird strikes, cleaning operations, maintenance operations, and the like. For example, birds may strike the aircraft 100 during flight. Moreover, the extending AOA sensors may be damaged during maintenance operations as personnel are walking adjacent to areas of the fuselage. Such damage may negatively affect performance of the aircraft 100.

Embodiments of the present disclosure are directed toward one or more sensors configured to measure airspeed of an aircraft. These sensors may be mounted to any sensor region 118 and/or to multiple sensor regions 118 located along the aircraft 100. In various embodiments, two of these devices, one mounted on top and one on the bottom of the fuselage 102 may be used to also determine the angle-of-attack (AOA). For example, determination of the airspeed may be combined with information of the flap positions, which may include differences in air velocities flowing over the two sensors. This output will then be equivalent and/or substantially similar to readings produced by current AOA sensors and pitot tubes.

Embodiments of the present disclosure provide numerous advantages over current systems. By way of example, the presently proposed sensors have no frontal area and are therefore less subject to damage by bird strikes. They are also in locations where they are unlikely to be stepped upon, as are the conventional sensors, which are mounted on the nose 112 of the aircraft 100. The sensors disclosed herein operate by measuring the rate of cooling of a heated metallic layer, and that rate of cooling is used to measure the velocity of air passing over the layer. The rate of cooling is determined by the air velocity and a number of other parameters, which are known or measured, including the difference between the layer temperature and the ambient temperature, the air density, the air temperature, and the presence or absence of water on the fuselage at the sensor location, and, to a minor extent, solar heating. Additional information used to determine the AOA includes the aerodynamic properties of the aircraft and the position of its flaps. It should be appreciated that other information may also be incorporated and utilized with embodiments of the present disclosure.

Figure 2:
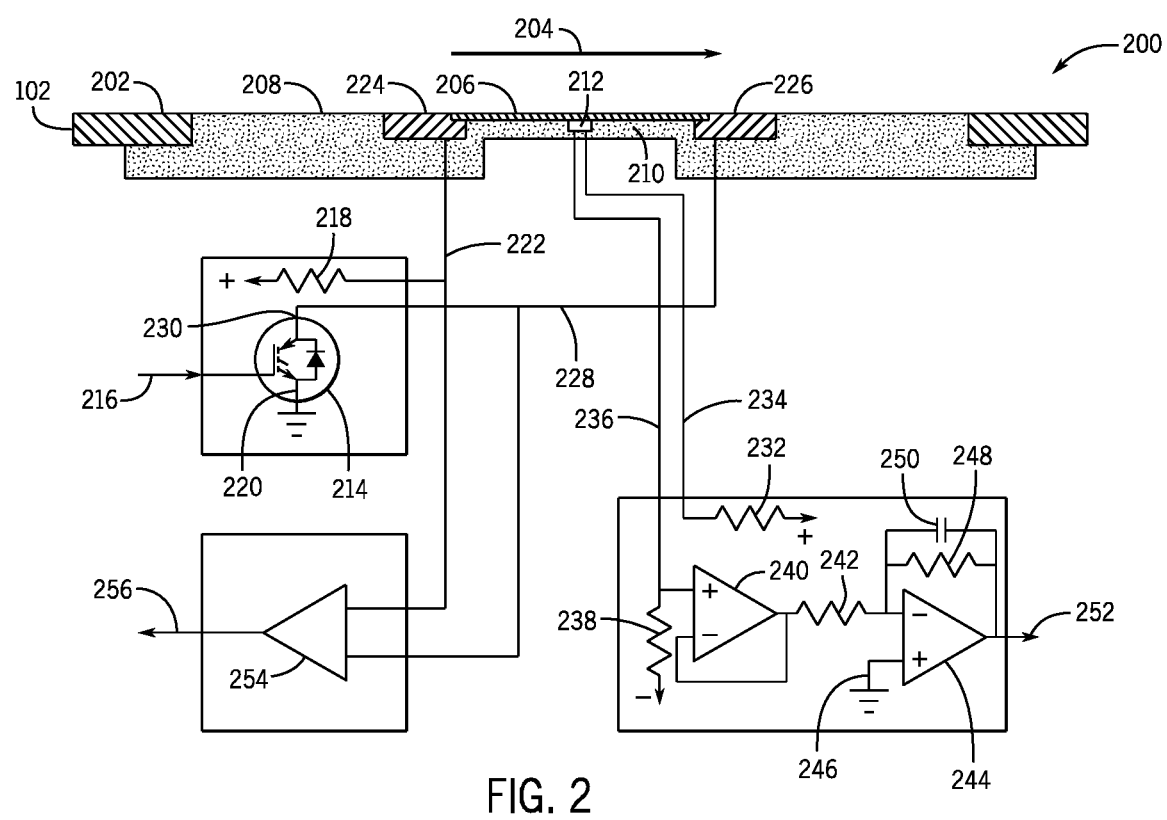
FIG. 2 is a schematic cross-sectional view of an embodiment of a sensor arrangement, in accordance with embodiments of the present disclosure.

FIG. 2 is a cross-sectional side view of an embodiment of a sensor assembly 200. The illustrated sensor assembly 200 is mounted to the fuselage 102. As shown, the sensor assembly 200 and/or components of the sensor assembly 200 are substantially flush with a surface 202 of the fuselage 102. Such an arrangement overcomes a problem of the above-referenced traditional AOA sensors in that there is no, or very little, structure extending and/or cantilevered off the fuselage 102. In various embodiments, the fuselage 102 is made of aluminum or carbon fiber reinforced resin, although it should be appreciated that other materials may be utilized within the scope of the present disclosure. The illustrated sensor assembly 200 is shown in an operational state where a vector 204 represents air flowing over the outside of the aircraft 100.

In various embodiments, the sensor assembly 200 includes a sensing layer 206 (e.g., layer 206, metallic layer 206), which may be a thin metallic layer. As will be described below, the layer 206 is heated and used to measure the cooling rate produced by the airflow vector 204. In various embodiments, the layer 206 is a metallic layer that is made of Invar® (e.g., FeNi36; 64FeNi), which is a nickel-iron alloy. Invar® provides advantageous properties associated with thermal expansion and contraction, which reduces stress. However, it should be appreciated that other materials provide similar benefits and may also be used in place of Invar®. In various embodiments, the layer 206 may be coated with an anti-corrosive material, such as gold, which may also reduce solar heating. While gold is provided as one example, it should be appreciated that other coatings may also be used.

The illustrated sensor assembly 200 also includes an insulating material 208 that is both thermally and electrically insulating. The insulating material 208 may include ultra-violet stabilized glass reinforced epoxy, however, other materials may also be used. The insulating material 208 is arranged to support the layer 206 and also to support a difference in air pressure between the inside and outside of the fuselage 102. In various embodiments, the underside of the insulating material 208 is exposed to atmospheric air so that no heat flows through this layer due to a temperature differential that would otherwise be imposed. In the illustrated embodiment, the layer 206 extends over at least a portion of the insulating material 208 and rests on a platform 210 where the layer 206 is directly coupled to the insulating material 208. It should be appreciated that this arrangement is provided as an example and other arrangements may be utilized in accordance with embodiments of the present disclosure.

The sensor assembly 200 further includes a temperature probe or sensor 212 communicatively coupled to the layer 206. For example, in embodiments, the temperature probe 212 is arranged in thermal contact with the layer 206. In various embodiments, the temperature probe 212 is a semiconductor device, which admits one microampere per degree Kelvin, with no offset. The temperature probe 212 may be particularly selected to operate over a predetermined or desired temperature range (e.g., an expected or anticipated temperature range) and has high stability. In an example, a ceramic package provides a thermal time constant of 0.1 seconds when in contact with a metal object, such as the layer 206. By way of example, such a device is commercially available from Analog Devices, Inc. as AD-590.

As noted above, the layer 206 may be heated to measure the cooling rate due to the airflow 204. The heating of the layer 206 of the illustrated embodiment is controlled by an isolated gate bipolar transistor (IGBT) 214, which switches the heating current on and off. It should be appreciated that the IGBT 214 may be particularly selected to have sufficient voltage and current capacity for the application, and have sufficient cooling to keep its temperature within its ratings. That is, various features of the IGBT 214 may be particularly selected based on intended operational parameters. The IGBT 214 is operable when an input signal 216, described herein, is applied to the gate of the IGBT 214. For example, a voltage of 0 volts may be used to turn the IGBT 214 off while a positive voltage (e.g., 10 volts) is used to turn the IGBT 214 on. In this manner, one or more control systems may be utilized to adjust and regulate heating by the IGBT 214.

Further illustrated is a resistor 218, which may be a high accuracy, low temperature coefficient of resistivity, adequate power rating, and adequately cooled resistor. It should be appreciated that properties sufficient for anticipated operations may be particularly selected. The illustrated resistor 218 is connected at one end to a high stability positive power supply (not pictured) with adequate voltage and current capabilities, as noted above. This power supply voltage is with respect to ground, which is connected to an emitter 220 of the IGBT 214. The second terminal of the resistor 218 is connected to a conductor 222, such as a wire, which conducts current to a positive terminal 224. The positive terminal 224 may be formed from any material which is a good conductor, such as copper. As shown, the positive terminal 224 is electrically bonded to the layer 206 such that at least a portion of the layer 206 overlaps at least a portion of the positive terminal 224. In operation, current flows through the layer 206 to a negative terminal 226, which is also a good conductor, such as copper, to heat the layer 206. Current from the negative terminal 226 continues through a conductor 228, which may be another wire, to a collector 230 of the IGBT 214. Power provided across the layer 206 may be modulated or otherwise controlled in order to control heating of the layer 206.

Further illustrated for the sensor assembly 200 is a resistor 232 having a first end connected to a positive power supply (not pictured) and a second end connected to the temperature probe 212. This arrangement limits the voltage across the temperature probe 212 to maintain the voltage within a linear operating range at all temperatures expected for the temperature probe 212. In other words, embodiments of the present disclosure provide the illustrated configuration the ability to keep the self-heating of the probe 212 to a negligible level and to provide protection in the unlikely event of a short circuit. The second terminal of the resistor 232 is connected to a conductor 234 which applies voltage to the anode of the probe 212. Further illustrated is a conductor 236 is connected to the cathode of the probe 212. This current is transmitted to a resistor 238, which as a terminal connected to a high stability negative power supply (not pictured). In various embodiments, the resistor 238 is particularly selected for high accuracy and stability.

The voltage drop across the resistor 238, caused by the current from the probe 212, produces a voltage at the non-inverting input of a chopper-stabilized operational amplifier 240, whose output is connected to its inverting input. The purpose of the amplifier 240 is to present a high impedance to the voltage on the conductor 236 so that the value of that voltage is not altered appreciably, and the chopper stabilization minimizes the voltage offset introduced between the amplifier's input and output. A resistor 242 converts the voltage from the amplifier 240 to a current at the inverting input of an operational amplifier 244. The voltage at the inverting input to amplifier 244 is held at zero volts because the amplifier's non-inverting input 246 is connected to ground. The amplifier 244 is also chopper stabilized to minimize the voltage difference between its two inputs. In this embodiment, the amplifier 244 provides a voltage gain, which is determined by the resistance ratio of a resistor 248 to that of the resistor 242. High frequency noise is suppressed by a capacitor 250. The amplifier 244 output voltage 252 is proportional to the negative of the temperature, with a voltage offset produced by the resistor 238, designed to have a useable value over the temperature range that will be encountered by the probe 212. A typical waveform for output 252 is described herein.

The conductors 222, 228 also deliver the voltage at each end to the layer 206 to the inputs of a differential operational amplifier 254. An output 256 of the amplifier 254, referenced to ground, represents the voltage across the layer 206, the power input to which is governed by the current through the resistor 218 and the resistance of the layer 206, which is governed in turn by its geometry and its resistivity, which is known as a function of temperature. The output 256 of the amplifier 254 is used to ensure that no damage has occurred to the layer 206 or the circuitry controlling its heating.

It should be appreciated that a number of deviations from the system described in the FIG. 2 can be made within the scope of this invention. As an example, the outer surface of the fuselage 102 may be continuous, and various components, such as the layer 206, the insulating material 208, the temperature probe 212, and the terminals 224, 226 may be mounted exterior to the fuselage 102. In this case, the fuselage surface may or may not be formed with a depression to prevent the sensor assembly 200 from protruding. However, in embodiments, the sensor assembly 200 may protrude. In other words, in various embodiments at least a portion of the sensor assembly may be recessed below the surface 202, at least a portion of the sensor assembly may be substantially flush with the surface 202, and/or at least a portion of the sensor assembly may protrude from the surface 202.

Furthermore, in embodiments, the terminals 224, 226 may be located in any orientation with respect to the airflow direction. Additionally, various methods of supporting the layer 206 may be used, such as 3-D printing of a columnar structure onto the layer 206, which may further reduce thermal effects.

In at least one embodiment, the heating of the layer 206 may be continuous rather than pulsed, and the power may be varied to produce a particular temperature increase. The temperature of the layer 206 may be measured with a thermocouple, and the reference junction for this thermocouple may be located at the terminals 224, 226, or may be any other location at which the temperature is not appreciably affected by the heating or the layer 206. Furthermore, it should be appreciated that heating of the layer 206 may be provided by induction or by infrared rather than resistively. Accordingly, the embodiment illustrated in FIG. 2 is provided for illustrative purposes only and is not intended to limit the scope of the present disclosure.

The circuitry illustrated in FIG. 2 uses DC power. However, it should be appreciated that AC power may be used, for example, for the heating, in which case the IGBT 214 would be a TRIAC (e.g., a triode for alternating current, a three terminal electronic component that conducts current in either direction when triggered) instead of an IGBT. Additionally, in embodiments, the resistor 232 may be omitted and a voltage supply referenced to the output of the amplifier 240 used. This would be stable because the current transmitted by the probe 212 is substantially independent of the voltage across it when the voltage exceeds 4 volts, as an example.

Moreover, in various embodiments, an additional stage of inversion may be added to the output 252. The resistor 232 and/or the resistor 238 and/or their power supplies may be remotely changeable to keep the output 256 within a narrower range. Duplicates of the sensor assembly 200 or any part of it may be used as desired to increase reliability even further.

The output 252 and/or the output 256 may, and as is illustrated in the embodiment shown, go to analog-to-digital converter(s) and from there to a computer or specialized digital circuitry, and a waveform (shown in FIGS. 3A-3C) may be generated by a digital-to-analog converter controlled by a computer or computer equivalent. It should be appreciated that references to the computer or circuitry may refer to one or more microprocessors and at least one memory, where the memory may store machine readable code that is executed by the one or more microprocessors.

As noted above, FIG. 2 of the present disclosure are provided for illustrative purposes and it should be appreciated that various components may be substituted or otherwise replaced with different configurations. As an example, any means of measuring the temperature of the layer 206 may be incorporated, such as but not limited to, infrared thermometry. Furthermore, any suitable material rather than the Invar® disclosed may be used for the layer 206. Additionally, any circuitry other than the one shown for processing the temperature signal may be used if it provides the equivalent function. Moreover, any device other than the IGBT 214 shown, including but not limited to a standard power transistor or mercury wetted relay, may be used for controlling the power applied to the layer 206. Additionally, any configuration of the layer 206 other than the configuration of FIG. 2 that can reasonably be labeled "layer" can be used if it provides the equivalent function. Furthermore, any number of decay time constants other than the six shown in the waveform (FIGS. 3A-3C) may be used provided that the difference in temperature between the layer 206 and the outside air is known. Furthermore, the duty cycle and/or repetition rate and/or shape of the waveform (FIGS. 3A-3C) may have any value, and may be variable. Also, the voltage applied to the resistor 218 may be variable.

In various embodiments, one or more of the fuselage 102, the layer 206, the insulating material 208, the temperature probe 212, and/or the terminals 224, 226 may not be bonded together, as shown in FIG. 2, but may be mounted or otherwise coupled together using any alternative means that provides the same functionality, including but not limited to brackets, screws, O-rings, crimping, and force fits. Furthermore, the gold plating of the layer 206 may be omitted or an alternative plating material may be used. Moreover, the terminals 224, 226 may be made of any suitably conductive material. Additionally, separate heating of the terminals 224, 226, and part of insulating material 208 may be applied to prevent icing. Also, the layer 206 dimensions may have any values provided that the thermal conduction from a selected location on the layer to the terminals 224, 226 is not a significant fraction of the transfer from said location to the airflow 204.

Figure 3A:
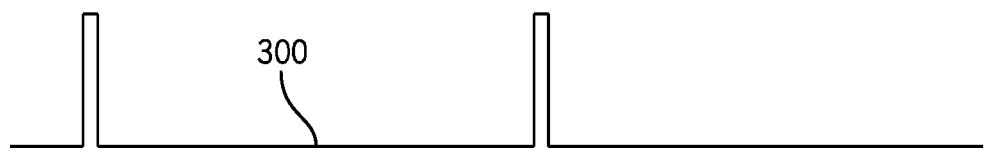
FIGS. 3A-3C are graphical representation of embodiments of waveforms, in accordance with embodiments of the present disclosure.
Figure 3B:
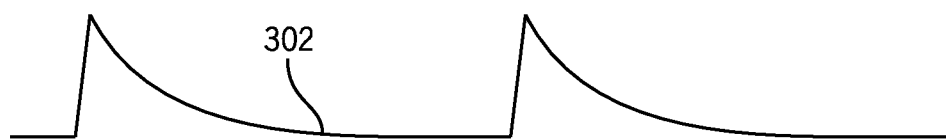
Figure 3C:
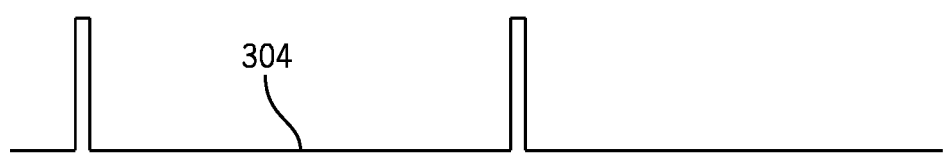

FIGS. 3A-3C are graphical illustrations of waveforms for the voltage applied to the layer 206. FIG. 3A illustrates a typical waveform 300 for the voltage applied to the layer 206. In this example, time is represented on the x-axis and voltage is represented on the y-axis. In this embodiment, a duty cycle appreciably below fifty percent is used to raise the applied control voltage from zero to ten volts, which will switch the IGBT 214 from non-conducting to conducting. FIG. 3B illustrates the temperature waveform 302 of the layer 206, and is the inverse of the voltage at the output 252. Again, time is shown on the x-axis, but temperature is now illustrated on the y-axis. In certain embodiments, the time between FIGS. 3A and 3B may be aligned and correspond to one other. The temperature rises approximately linearly while power is applied (as shown at the time when compared to FIG. 3A), and decays approximately exponentially due to cooling by the airflow 204. The waveform 302 shows six exponential time constants so that the temperature before the next heating pulse is essentially at the asymptotic temperature without heating. FIG. 3C illustrates the output 256 as waveform 304 and directly measures the voltage drop on the layer 206. The current through the layer 206 is the voltage at the output 256, divided by the known resistance of the layer 206. The voltage across the layer 206 ($V_3$), in addition to being measured directly by the amplifier 254, is calculable as (the voltage applied to the resistor 218 (Vg) minus a known on-state collector to emitter voltage drop in the IGBT 214 ($V_6$)) times the resistance of the layer 206 ($R_3$) divided by the sum of the resistance of the resistor 218 ($R_8$) and the resistance of the layer 206), as illustrated in Equation 1.

$$V_3 = \frac{(V_8 - V_6)R_3}{(R_8 + R_3)} \qquad \text{(Equation 1)}$$

The power applied to the layer 206 ($P_3$) is the product of the current through the layer 206 ($I_3$) and the voltage across the layer 206. The energy deposited in the layer 206 ($E_3$) is the applied power times the time (t) for which it is applied. The temperature increase of the layer 206 ($T_3$) is the deposited energy divided by the known heat capacity of the layer 206 ($C_3$). The temperature of the layer 206 returns toward the ambient temperature at a rate ($r_3$) proportional to the temperature difference between layer 206 and the ambient temperature ($\Delta T_{3-A}$) times the power removed by the air flow 204 per unit temperature difference ($P_2$) and divided by the heat capacity of the layer 206. These relationships are represented below in Equations 2-5.

$$P_3 = I_3 V_3 \quad \text{(Equation 2)}$$

$$E_3 = P_3 t \quad \text{(Equation 3)}$$

$$T_3 = \frac{E_3}{C_3} \quad \text{(Equation 4)}$$

$$r_3 = \frac{\Delta T_{3-A} P_2}{C_3} \quad \text{(Equation 5)}$$

In various embodiments, the sensor assembly 200 may also determine the effect of fluid (e.g., rain, snow, sleet, etc.) and compensate the measurement for it. The presence of water on the surface will reduce the temperature rise of the layer 206 when a fixed amount of energy is added, and the amount of water on the surface will be determined from the amount of this reduction. Water moving across the layer will alter the cooling of the layer by the air, and the amount by which the cooling is reduced will be a known function of the water layer thickness and the airspeed. The correct airspeed is then determined by taking this effect into account.

Further embodiments may also be deployed to prevent the development of ice on the layer 206. For example, ice formation may be disrupted by briefly interrupting the normal functioning and applying enough heat to the layer 206 to remove the ice. Accordingly, the sensor assembly 200 may operate in a variety of different weather conditions.

Embodiments of the present disclosure may be utilized with commercial aircrafts to provide improved AOA sensors. By way of example only, with reference to information regarding the 737 Max manufactured by The Boeing Company. The 737 Max has a nominal cruising altitude of 37,000 feet and airspeed of 725.4 feet per second, or 494.6 miles per hour. Taking the proportionality into account with known nominal temperature, pressure, and density information as a function of altitude, while also disregarding deployment of the aircraft's flaps which is substantially negligible for this determination, a cooling rate may be determined with respect to the embodiment of FIG. 2. In certain embodiments, a commercially available heat sink, Cincon model FBL254T, sold by Digi-Key®, publishes data showing thermal resistance as a function of air velocity flowing across it. This data sheet also indicates that the heat sink is made of 6063 aluminum. The total thermal resistance of the heat sink is the thermal resistance of the aluminum plus the thermal resistance of the heat transfer from the surface to the flowing air. The average distance heat has to flow before being transferred to the air is half way up the fins from the base to which the fins are attached. Heat is applied uniformly to the bottom of the heat sink. The result is 0.309° C./Watt for the aluminum.

The thermal resistance to the air is then obtained by subtracting this number from the total at each air velocity. This result can then be fitted to a power law, and the power providing the best fit is negative 0.73879. The result is ° C./W=2.1163*(airspeed in fpS)$^{(-0.73879)}$.

The layer 206 may be utilized with these calculations and approximated as having dimensions of 5 cm by 5 cm, but it should be appreciated that these dimensions are for an example calculation only. The heat sink result is translated to the heated plate, as provided herein. The example calculations determines W/° C. for the example layer 206 as a function of feet per second of airflow. The calculation begins by inverting the equation at the end of the preceding paragraph to obtain W/° C.=0.47251*(airspeed in fps)$^{+0.73879}$). The coefficient in this equation is converted to W/(° C.*cm$^2$) by dividing the coefficient by the area, in square centimeters, of the heat sink. The effective surface area of the heat sink is equal to its length times [the number of fins times the sum of the fin tip width, the inter-fin spacing (at the base, minus one space), and the sum of the heights of each side of each fin]. The heat sink bottom is not included because that is where the heat enters the heat sink. The example heat sink area is 489.2 square centimeters, so the coefficient per square centimeter becomes 0.00096957 W/(° C.*cm$^2$). The plate (item 206) has 25 square centimeters, so the coefficient in W/° C. for the plate is 0.0241493 W/C°.

Air thermal conductivity and air density have an effect on the heat transfer. The specific heat at constant pressure also has an effect, but it does not change much with altitude. Both are known functions of altitude. The density, and associated thermal conductivity, can also be determined directly from the barometric pressure and the air temperature, both of which are standard measurements on commercial aircraft, along with altitude.

Figure 4:
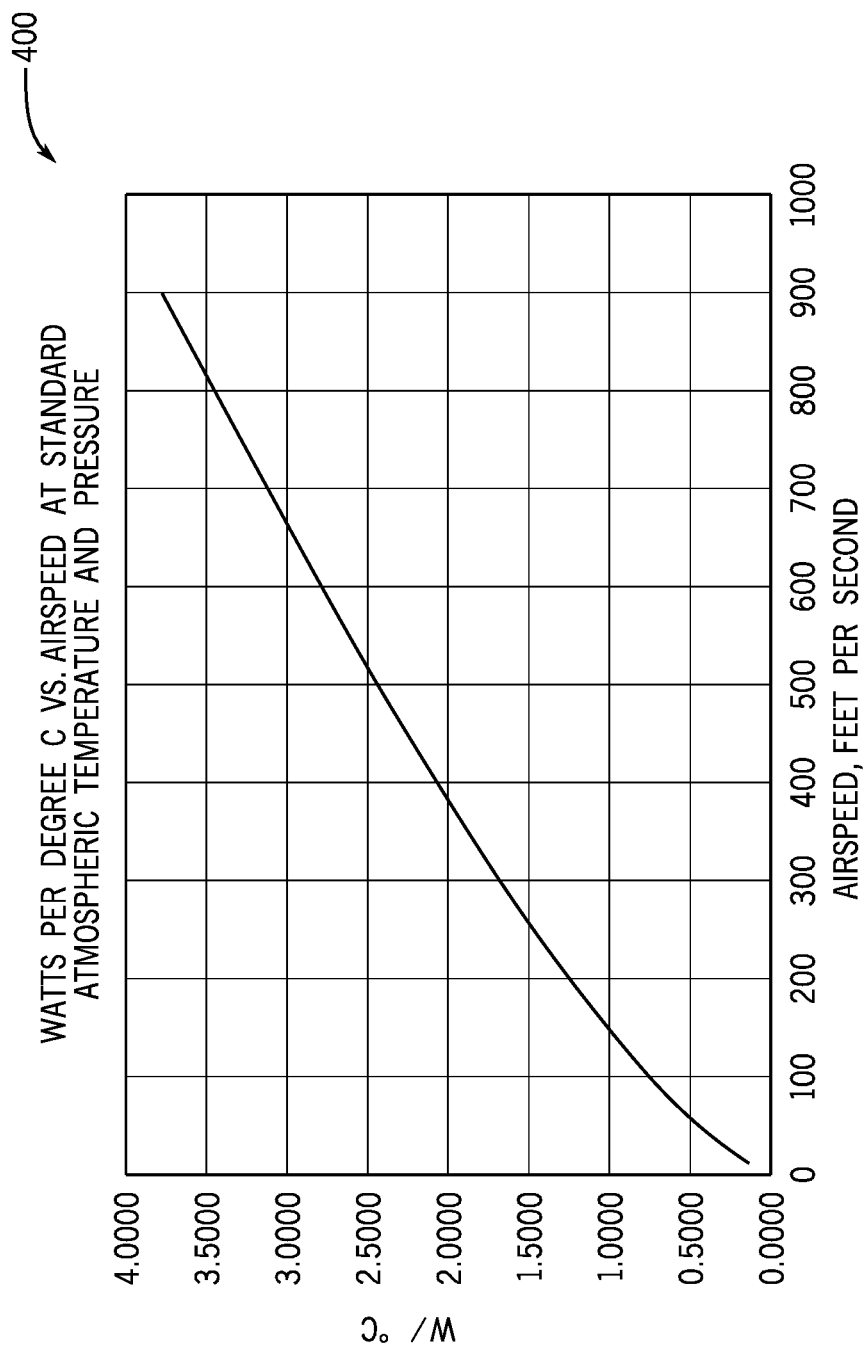
FIG. 4 is a graphical representation of Watts per degree C. vs. Airspeed, in accordance with embodiments of the present disclosure.

FIG. 4 is a graphical representation of the resulting function of Watts per ° C. vs. Airspeed at standard temperature and pressure is shown on the graph 400 "Watts per Degree C. vs. Airspeed at Standard Atmospheric Pressure and Temperature." This curve will be the result of applying known adjustments to the actual measurements and represents information needed to determine airspeed. The actual measurements are adjusted because the measured value depends on the altitude in a known fashion. It should be noted that making these adjustments can now be automated, but would have been difficult or impossible before modern computers were developed. Note that this curve has the highest slope at low speeds, where airspeed and AOA are most critical, and that it has a respectable slope everywhere. This means that the resolution is good everywhere, and even better where most critical. In contrast, the force on a conventional AOA sensor is proportional to the square of the airspeed, so the resolution is lowest at low airspeeds.

Figure 5:
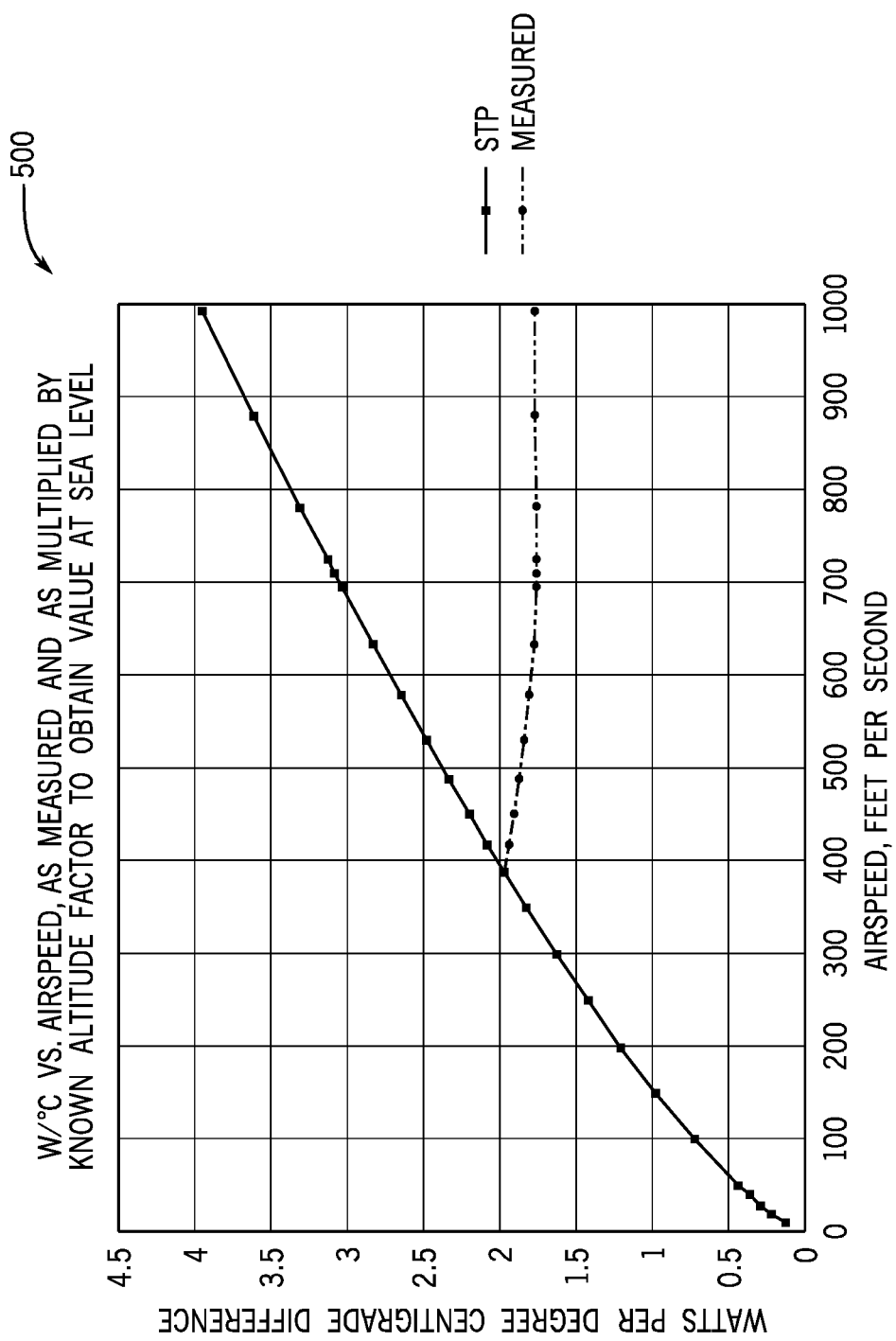
FIG. 5 is a graphical representation of Watts per degree C. vs. Airspeed, in accordance with embodiments of the present disclosure.

FIG. 5 illustrates a graphical representation for "W/° C. vs. Airspeed, As Measured and As Multiplied by Known Altitude Factor to Obtain Value at Sea Level." This graph 500 shows the value that will actually be measured and the value obtained by multiplying that measurement by a known function of altitude. The fact that the measured curve is double valued and has flat regions is immaterial because the adjusted curve is single valued and has no flat regions. The two curves are shown as identical before takeoff because the altitude is not changing. The deployment of flaps for takeoff is not taken into account, and will result in takeoff at a lower airspeed; the adjusted curve is unaffected by this difference.

The curves shown in the graph 500 are based on nominal airspeed vs. altitude. The actual airspeed can vary somewhat from this value, and this sensor exhibits an advantageous feature when this occurs, as described by Equation 6, which uses V to represent velocity, M to represent the measured thermal conductance, S to represent the thermal conductance that would occur at standard temperature and pressure, and d to represent differentiation.

$$\frac{1}{M}\frac{dM}{dV} = \frac{1}{S}\frac{dS}{dV} \quad \text{(Equation 6)}$$

As shown, when the measurement is multiplied by the altitude adjustment factor, the correct value of actual airspeed is obtained. As previously indicated, the altitude adjustment can be made more precisely using quantities normally measured by commercial aircraft. This uses the well-known gas law, which can be rewritten in Equation 7

$$\frac{N}{v} = \frac{P}{RT} \quad \text{(Equation 7)}$$

where v represents volume, N the number of mols, T the absolute temperature in degrees Kelvin, R the gas constant, and P the pressure. The gas constant, R, differs slightly from the perfect gas constant in a known fashion. This measure of density, along with knowledge of the temperature, allows the altitude adjustment to be precisely determined.

Further calculations may be provided in view of the properties of the layer 206. By way of example, two scenarios are considered, one at 100 feet per second and another at the takeoff speed of 387.4 feet per second. The corresponding thermal conductances are 0.9252 W/° C. and 1.9724 W/° C. As will be explained later, the preferred mode of operation is to maintain a constant differential temperature between the layer 206 and ambient.

The thickness of layer 206 may be made as a continuous sheet, but this thickness could be so thin that it would be at risk of damage, for example, when the aircraft is being washed. As previously indicated, one material for the layer is Invar® so that it is not subject to appreciable strain due to thermal cycling. The availability of metals with appreciably higher electrical resistivity is limited, so a design has been adopted in which the material (e.g., metal) is arranged in a zig-zag pattern, illustrated in FIG. 6.

Figure 6:
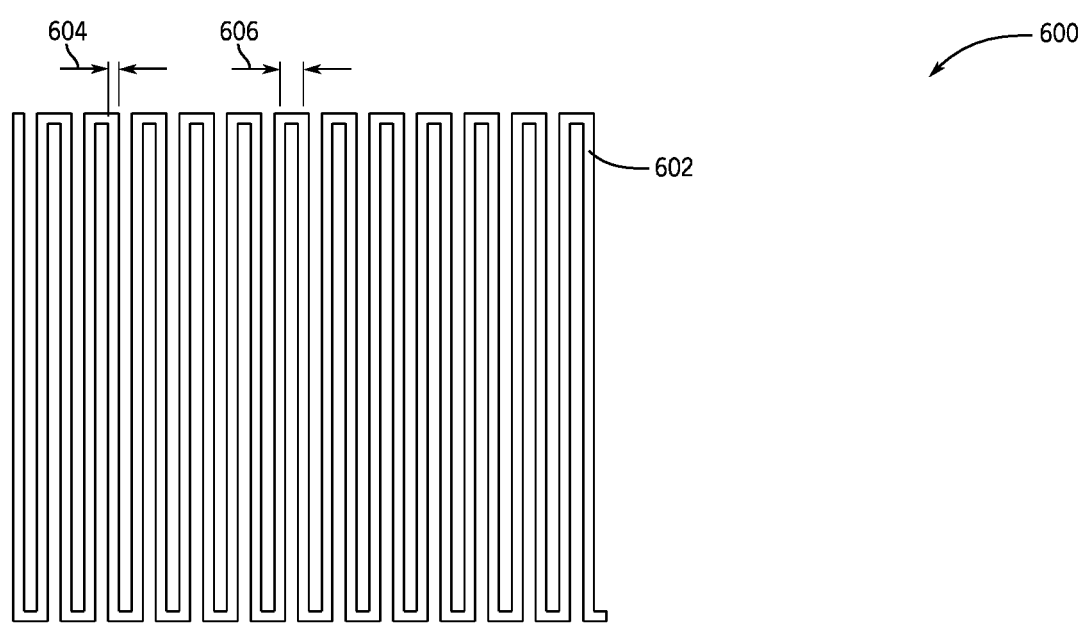
FIG. 6 is a schematic top view of an embodiment of a heated layer, in accordance with embodiments of the present disclosure.

FIG. 6 is a schematic top view of an embodiment of a sensing layer configuration 600 illustrating a zig-zag or alternating pattern. It should be appreciated that the configuration 600 may be positioned over the layer 206 and/or be integrated into the layer 206. In various embodiments, the configuration 600 may be described as appearing visually similar to a square wave. The properties of Invar®, or the equivalent under a different brand name, are: density 8.1 g/cm³; specific heat capacity 486 Joules/(kilogram*° C.); thermal conductivity 1.8 Watts/(meter*° C.); and electrical resistivity 78*10⁻⁸ ohm*m. These values are for 20° C., and have some variation with temperature. It is desirable to make the layer as thin as possible without compromising its mechanical integrity; a thickness of 10 mils, or 0.000254 meters, is selected as an example, but other thicknesses may also be used in different embodiments. The original layer area of 5 cm by 5 cm is retained. The conductors 602 include a thickness 604 of approximately 1.8 mm. Moreover, this configuration includes with a center-to-center spacing 606 of approximately 2.0 mm. In this example, there are 25 such conductors 602 connected in series. Accordingly, the resistance is 2.056 ohms and, for a temperature differential of 3 degrees C. above ambient, the power range is 2.78 to 5.91 watts, the current range is 1.16 to 1.70 amperes, and the voltage range is 2.39 to 3.49 volts, all of which are convenient values.

Other quantities to explore include the temperature drop across the layer 206. This is given approximately by the half-thickness (the heat is generated uniformly within the layer) times the wattage divided by [the thermal conductivity times the area]. As noted previously, the temperature probe 212 is mounted on the bottom of the layer 206. The result is a maximum of 6.4% of the difference between the layer surface temperature and the ambient, and may be corrected for by software.

Another quantity is the thermal time constant. This is given by the density times the volume times the temperature differential times the specific heat capacity divided by the heat transfer rate to the ambient. The longest time constant results from the lowest power, or 2.78 watts. This yields a time constant of 2.34 seconds. This could potentially be objectionably long if one operated in pulsed mode and waited several time constants for the layer to return to ambient temperature. As a result, various embodiments utilize continuous operation, in which the power is regulated to maintain a constant temperature differential. The thermal time constant of the ceramic package AD-590 is 0.1 seconds, which does not add an appreciable amount to the overall time constant.

Maintaining a constant temperature differential may utilize independent knowledge of the ambient temperature. This is obtained by using a sensor thermally connected, for example, to the terminals 224, 226. The temperature sensor may be the same type as the temperature probe 212 and connected to circuitry similar to that shown in the FIG. 2, however it should be appreciated that other temperature sensors may be utilized. The two temperature sensors may have slightly different offsets, and the difference between these offsets may be measured by interrupting the power to the layer 206 for a few seconds. The terminals 224, 226 may also have gold plating, such as the plating described with respect to the layer 206, so that the small solar heating effect is effectively cancelled.

Figure 7:
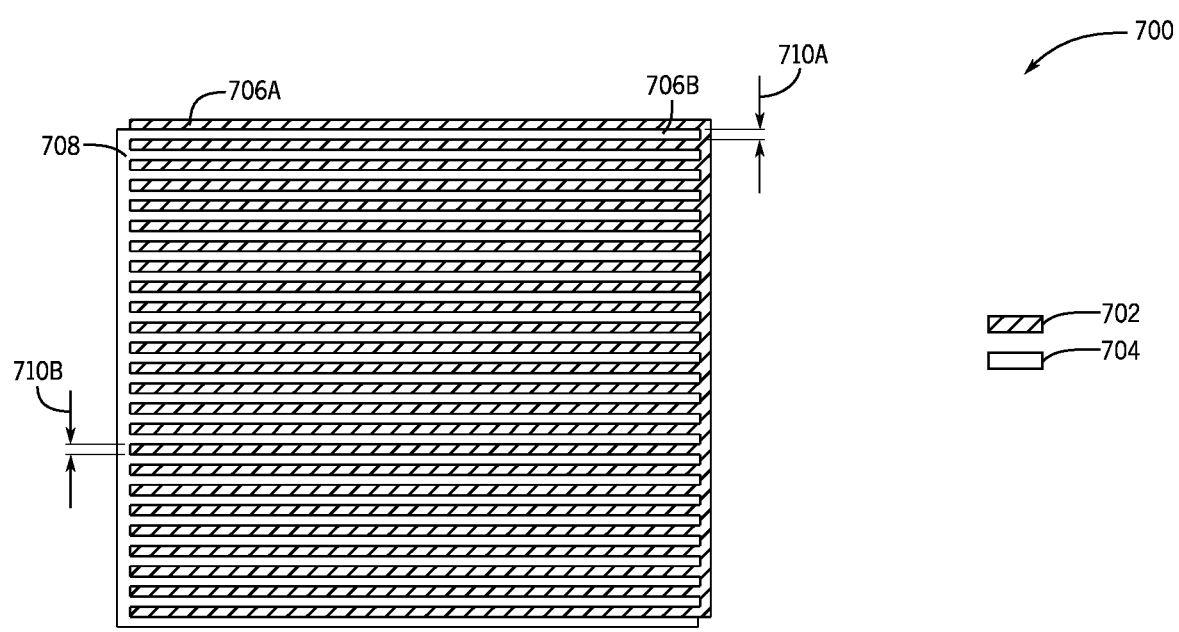
FIG. 7 is a schematic top view of an embodiment of insulated combs, in accordance with embodiments of the present disclosure.

Maintaining a constant temperature differential also incorporates an independent method of determining the presence of water on the surface due to rain, as shown in the schematic top view of FIG. 7. FIG. 7 illustrates a configuration 700 that incorporates two interleaved but insulated combs 702, 704. It should be appreciated that the configuration 700 may be positioned over the layer 206 and/or be integrated into the layer 206. It should be appreciated that the combs refer to tines 706A and 706B extending away from a base 708 with spaces 710A and 710B between adjacent tines 706A and 706B. In this example, a first set of tines 706A are positioned within the spaces 710B of the second set of tines 706B and the tines 706B are positioned within the spaces 710A. These combs form a capacitor, and the capacitance is determined by the geometry and by the thickness of a water layer on the surface. The capacitor is insulated from the water by a thin insulating layer, which is abrasion resistant and ultraviolet resistant in certain embodiments. In various embodiments, the capacitor is mounted flush with the surface and may be embedded in the insulator 208.

The current is proportional to the capacitance when a constant high frequency voltage is applied. The cooling effect of the water will be a calibrated function of the layer thickness, the airspeed, the temperature (which controls the water viscosity), and the ambient air density. The added power due to this is subtracted from the measured cooling power. As noted above, in certain embodiments, the underside of the insulating layer 208 is exposed to external atmospheric air so that no heat (e.g., substantially no heat, a negligible amount of heat, heat below a threshold) flows through this layer due to a temperature differential that would otherwise be imposed. Another caveat is that the lowest temperature the aircraft is likely to encounter is somewhat below the lowest temperature for which the AD-590 is rated, which may be used in certain embodiments. Embodiments may incorporate alternative devices with a suitably low value or alternatives, such as thermocouples or other means of temperature measurement, may be used.

The regulated power applied to the heated layer 206 can be controlled either by pulse width modulation or by proportional control of a transistor having suitable properties. If pulse width modulation is used, the inter-pulse time separation may be a small fraction of the thermal time constant of the heated layer to avoid measurable temperature modulation. Means for heating all surface components of this sensor for deicing purposes would be desirable in certain embodiments, as noted above.

The differential amplifier 254 measures the voltage across the heated layer 206, and the current can be determined by measuring the voltage drop across the resistor 218 or by any other convenient means, thereby determining the applied power as the product of the voltage and current. Alternatively, the power can be determined as the square of the voltage divided by the resistance, which will be a known function of the temperature.

The regulation of the temperature differential can be accomplished by a conventional PID (proportional-integral-differential) controller or by any appropriate computer control.

Many of the parameters described, including but not limited to the temperature differential maintained, the thickness of the heated layer, the type of metal or other material used to form the layer, the number of passes of the conductor from side-to-side, and the overall dimensions of various components can be changed within the scope of the present disclosure.

As an example, the layer 206 may bonded to the insulator 208 in various embodiments. However, it should be appreciated that the layer 206 may also couple to the insulator 208 using a variety of other methods, such as mechanical fasteners or anchors and the like. Moreover, the method of attachment of the conductors 222, 228 to the terminals 224, 226 can be of any suitable type, or they may be formed as single units.

In an embodiment of the sensor assembly, the outer surface profile closely matches the profile of the surface of the aircraft, with the exception of passages or other means permitting outside air to maintain the underside of the sensor at the outside temperature. However, it should be appreciated that one or more portions of the sensor assembly may be recessed below the surface and/or extend above the surface to protrude from the surface.

It should also be noted that the power law dependencies used in the calculations discussed above are intended to be good approximations, but that an actual implementation will presumably use piecewise connected curves which are continuous at their connecting locations and preferably have continuous slopes at those locations.

Figure 8:
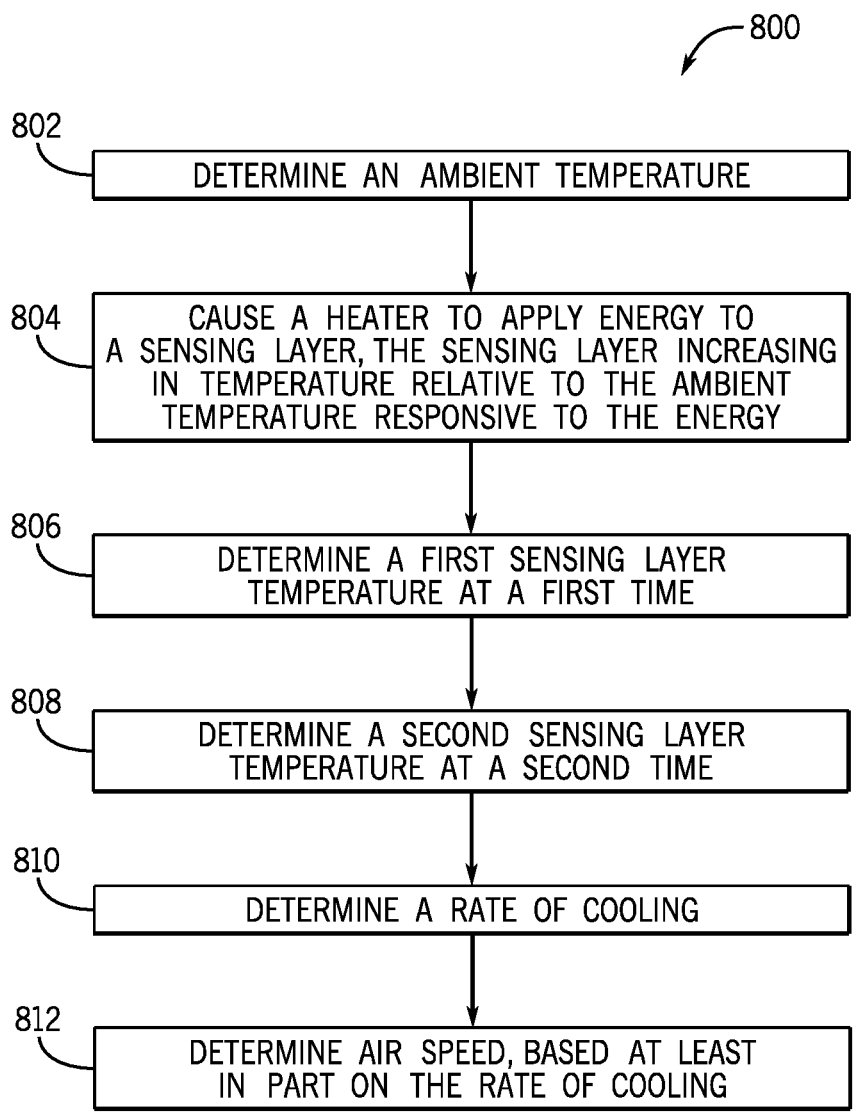
FIG. 8 is a flow chart of an embodiment of a method for determining an air speed, in accordance with embodiments of the present disclosure.

FIG. 8 is a flow chart of an embodiment of a method 800 for determining an air speed. It should be appreciated that for this method, or any method described herein, that there may be more or fewer steps. Additionally, the steps may be formed in a different order or in parallel, unless otherwise specifically stated. In this example, an ambient temperature is determined 802. For example, a sensor as described above may determine an ambient temperature. It should be appreciated that the ambient temperature may be from a sensor associated with the sensor assembly and/or from a separately mounted sensor. In embodiments, a heater is used to apply energy to a sensing layer, causing the sensing layer to increase in temperature 804. For example, a current may be applied across the sensing layer, as described above, among other options. A first sensing layer temperature is determined at a first time 806 and a second sensing layer temperature is determined at a second time 808. It should be appreciated that the respective temperatures may be determined directly or indirectly. For example, the respective temperatures may be measured using one or more sensors and/or may be correlated to a voltage output, among other options. A rate of cooling may be determined 810. In various embodiments, the rate of cooling is a representation of an air flow over the sensing layer cooling the sensing layer after the heater has increased the sensing layer temperature. Accordingly, an air speed may be determined 812. The air speed may be related to the air flow that cools the sensing layer.

Figure 9:
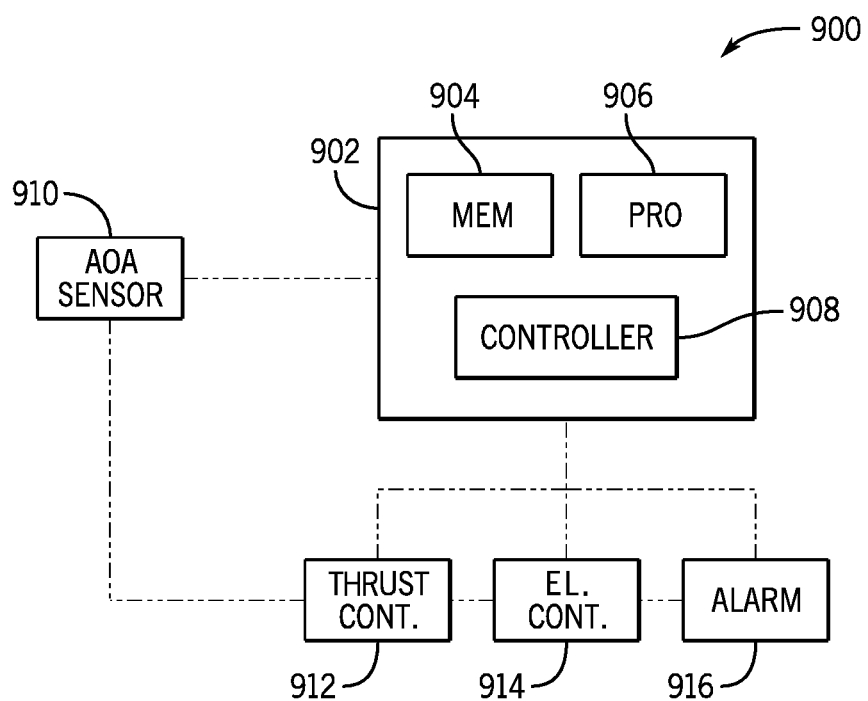
FIG. 9 is a schematic diagram of an embodiment of a control environment, in accordance with embodiments of the present disclosure.

FIG. 9 is a schematic diagram of an example of a control environment 900, which includes a control system 902 configured to receive information and/or transmit instructions to various aircraft components. In this example, the control system 902 includes a memory 904 (e.g., a non-transitory machine-readable memory) and a processor 906, such as a microprocessor or graphics processing unit (GPU). The processor 906 may execute instructions stored on the memory 904 and, in various embodiments, may transmit one or more control signals via a controller 908. For example, in this example, the controller 908 may include a transceiver that sends or receives information from various components of the aircraft, such as an AOA sensor 910, an engine thrust controller 912, a flaps and/or elevators controller 914, or an alarm 916.

In an example, the AOA sensor 910 may be utilized to determine the angle of attack and/or provide information to enable the control system 902 to determine the angle of attack by executing instructions stored on the memory 904. For example, the AOA sensor 910 may transmit sensor information that the control system 902 uses to determine the angle of attack. In various embodiments, additional information may also be used in the determination. In certain embodiments, a determination that exceeds a threshold may trigger an alarm 916 and/or an action to adjust the angle of attack, such as through a control signal transmitted to the engine thrust controller 912 and/or the flaps and/or elevators controller 914. Accordingly, in various embodiments, one or more signals may be generated based at least in part on information received from the AOA sensor 910. Furthermore, it should be appreciated that various embodiments may include information transmitted from one or more AOA sensors 910, and reference to a single sensor is for illustrative purposes and is not intended to limit embodiments of the present disclosure. As an example, the AOA sensors 910 may be positioned at different locations on the aircraft, such as at a top and bottom, on different sides, and the like.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A sensor assembly, comprising:
a metallic layer positioned at least partially on an insulating material, the insulating material coupled to a fuselage of an aircraft;
a pair of terminals arranged at opposite ends of the metallic layer;

a temperature probe thermally coupled to the metallic layer, the temperature probe positioned on an underside of the metallic layer and arranged within the insulating material; and a heating circuit that includes, at least in part, the metallic layer, the heating circuit providing electrical energy to adjust a temperature of the metallic layer.

2. The sensor assembly of claim 1, further comprising:
a second temperature probe configured to determine an ambient temperature, the second temperature probe positioned remote from the temperature probe such that temperature increases of the metallic layer are not transferred to the second temperature probe.

3. The sensor assembly of claim 1, wherein the heating circuit comprises:
an isolated gate bipolar transistor (IGBT), the IGBT regulating a current applied to at least one terminal of the pair of terminals, the IGBT receiving an input control signal at a gate.

4. The sensor assembly of claim 1, wherein the heating circuit provides at least one of a continuous current to the metallic layer or a pulsed current to the metallic layer.

5. The sensor assembly of claim 1, further comprising:
an interface between the metallic layer and an air flow flowing over the surface of the aircraft removing heat from the metallic layer responsive to the air flow.

6. The sensor assembly of claim 1, wherein the metallic layer further comprises:
an alternating pattern including spaces arranged between solid portions.

7. The sensor assembly of claim 1, wherein a second metallic layer further comprises:
a first portion of metallic material arranged in a first comb configuration; and
a second portion of metallic material arranged in a second comb configuration;
wherein tines of the first comb configuration are positioned within spaces of the second comb configuration.

8. A sensor assembly, comprising:
a sensing layer positioned along at least a portion of an aircraft fuselage;
an insulating layer coupled to the portion of the aircraft fuselage, at least a portion of the sensing layer being coupled to the insulating layer to thermally isolate the sensing layer from the aircraft fuselage;
a first terminal positioned at a first end of the sensing layer, the first terminal arranged within the insulating layer;
a second terminal positioned at a second end of the sensing layer, opposite the first end, the second terminal arranged within the insulating later;
a sensor coupled to the sensing layer, the sensor positioned within the insulating later; and
heating circuitry coupled to the sensing layer, the heating circuitry configured to direct a current through the sensing layer, via the first terminal and the second terminal, to increase a temperature of the sensing layer relative to an ambient temperature.

9. The sensor assembly of claim 8, wherein the sensing layer is formed from a metallic material.

10. The sensor assembly of claim 8, further comprising:
a plating applied to the sensing layer, the plating being at least one of a corrosion resistant material or a highly reflective material.

11. The sensor assembly of claim 8, wherein the sensing layer is flush with at least one of the insulating layer or a surface of the aircraft fuselage.

12. The sensor assembly of claim 8, wherein the sensing layer is recessed from at least one of the insulating layer or a surface of the aircraft fuselage.

13. The sensor assembly of claim 8, wherein the sensor senses a temperature of the sensing layer.

14. The sensor assembly of claim 8, wherein the current is at least one of a continuous current or a pulsed current.

15. The sensor assembly of claim 8, wherein the sensor assembly is positioned at a sensor area of the fuselage, the sensor area including at least one of an upper body portion or a lower body portion.

16. The sensor assembly of claim 8, further comprising:
a metallic layer arranged in a configuration including an interleaved comb, the configuration selected, at least in part, to determine a fluid layer on the sensing layer.

17. The sensor assembly of claim 8, further comprising:
a flow passage arranged below the insulating layer, proximate the sensing layer, the flow passage exposing an underside of the insulating layer to ambient air.

18. A sensor assembly, comprising:
a metallic layer positioned at least partially on an insulating material, the insulating material coupled to a fuselage of an aircraft;
a pair of terminals arranged at opposite ends of the metallic layer;
a temperature probe thermally coupled to the metallic layer, the temperature probe positioned on an underside of the metallic layer and arranged within the insulating material; and
heating circuitry providing electrical energy to adjust a temperature of the metallic layer, the metallic layer having an alternating pattern including spaces arranged between solid portions.

19. The sensor assembly of claim 18, further comprising:
a second temperature probe configured to determine an ambient temperature, the second temperature probe positioned remote from the temperature probe such that temperature increases of the metallic layer are not transferred to the second temperature probe.

20. The sensor assembly of claim 18, wherein the heating circuitry provides at least one of a continuous current to the metallic layer or a pulsed current to the metallic layer.

* * * * *